G. G. FOCKE.
MACHINE FOR MAKING ARTIFICIAL LEAVES.
APPLICATION FILED MAY 8, 1913.
1,401,062.
Patented Dec. 20, 1921.
3 SHEETS—SHEET 3.
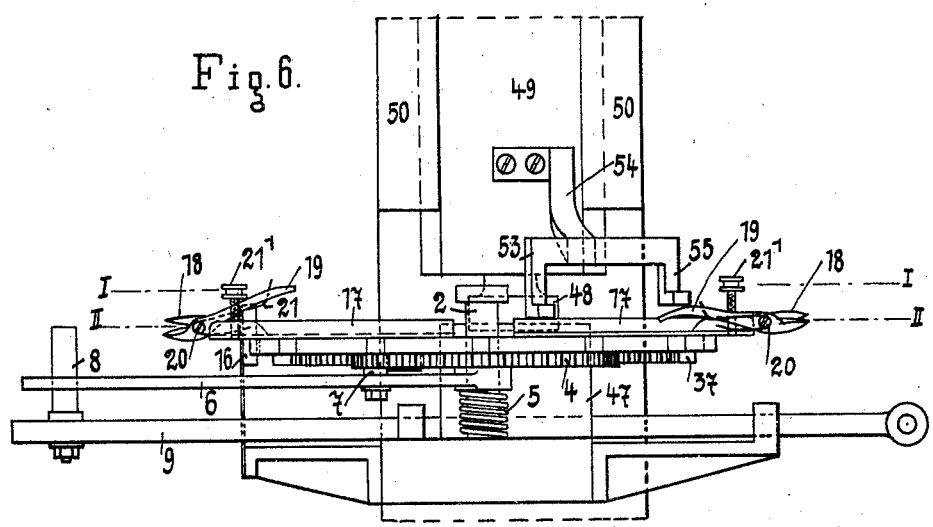
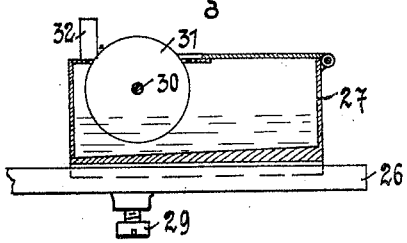
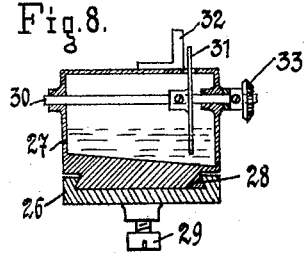
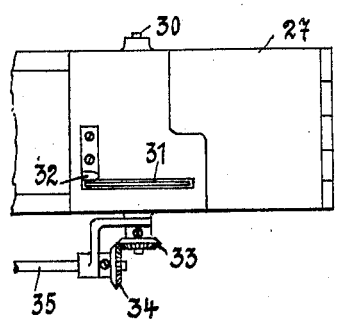
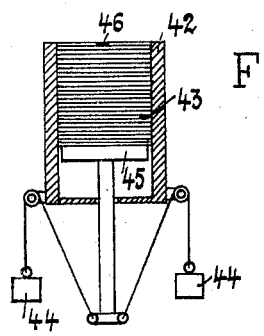
Witnesses:
John Murtagh
F. Hogg.
Inventor:
Georg Gustav Focke
by Focke & Focke
Attorneys

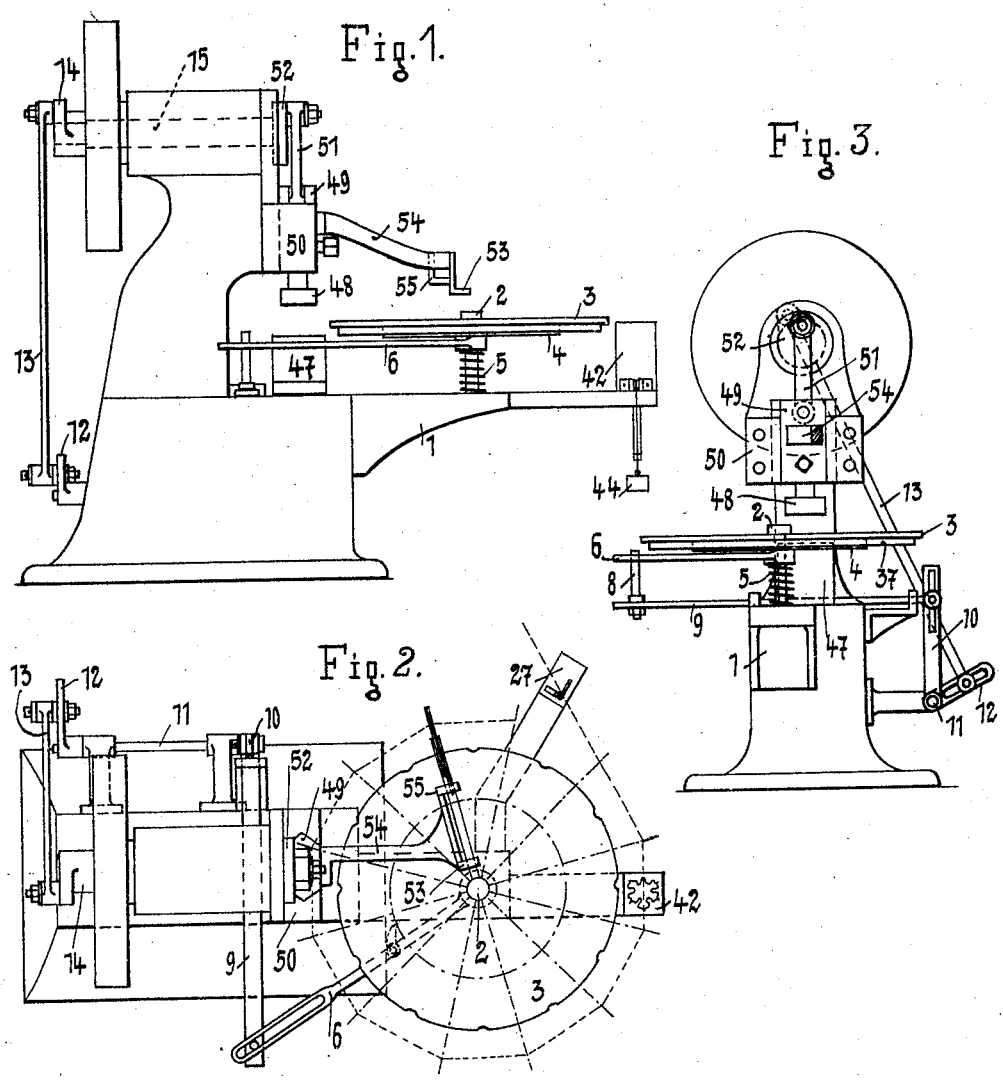

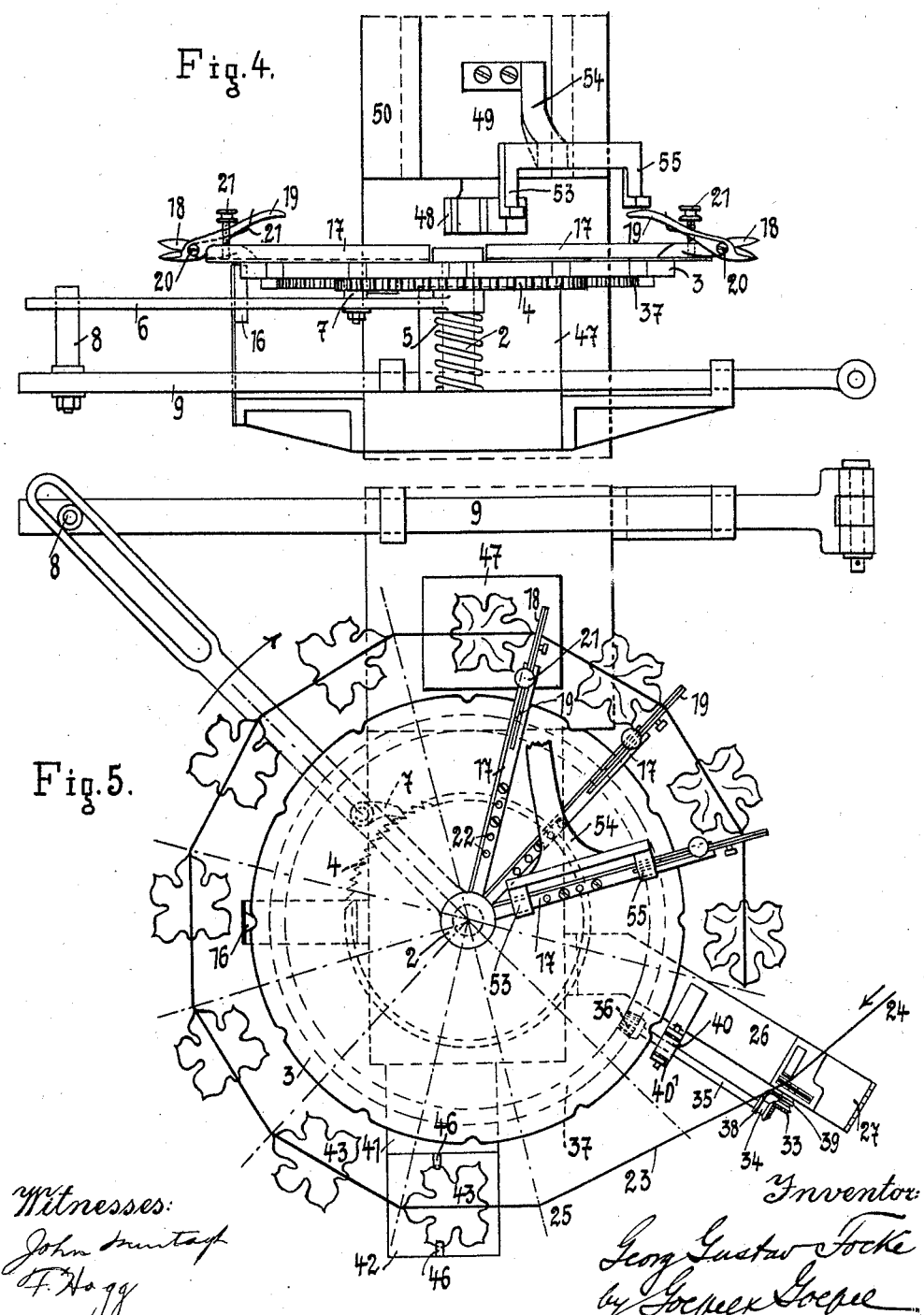

UNITED STATES PATENT OFFICE.

GEORG GUSTAV FOCKE, OF DRESDEN-BLASEWITZ, GERMANY.

MACHINE FOR MAKING ARTIFICIAL LEAVES.

1,401,062.           Specification of Letters Patent.    Patented Dec. 20, 1921.

Application filed May 8, 1913. Serial No. 766,302.

(GRANTED UNDER THE PROVISIONS OF THE ACT OF MARCH 3, 1921, 41 STAT. L., 1313.)

*To all whom it may concern:*

Be it known that I, GEORG GUSTAV FOCKE, merchant, a subject of the King of Saxony, residing at 10b Residenzstrasse, Dresden-Blasewitz, Kingdom of Saxony, Germany, have invented certain new and useful Improvements in Machines for Making Artificial Leaves, of which the following is a specification.

The present invention relates to machines for making artificial leaves, of the kind as has been patented by my United States Letters Patent 1,026,387. The present machine likewise is a machine in which in a continuous operation an endless wire, unwound from a bundle is covered with glue, an artificial leaf is pasted thereto, whereupon the wire with the leaf is carried into an embossing device which forms the leaf and is finally cut up into individual leafed stalks.

According to the present invention the wire is guided through the machine by means of a star-shaped feeding or turning body, which unwinds the wire from the bundle and draws it in the shape of a perimeter of a polygon over its periphery, or between the supporting ends of its several radiating arms. Each tangential piece of wire between two arms will make one stem of a leaf, which is first covered with glue, whereupon the leaf is pasted to it, and the wire with the said leaf is passed through the embossing device and finally severed. The devices required for these operations are stationarily arranged on the periphery of the feed body. By such means the wire is kept taut, its tendency to bend or twist is suppressed and lastly a very practical construction of the machine is obtained.

Separate means may be provided for holding and drawing the wire and separate means for severing it. However, both these means may also be combined, by providing shears on the radiating arms, in the open, wedge-shaped mouths of which the wire will catch itself, whereupon, when the said mouths are subsequently closed after the operation has been completed, the wire will be severed. If these shears are made radially adjustable, the length of the stem may be easily varied. Of course, in this case also the stationary devices must be made radially adjustable relatively to the center of the star.

With regard to the several devices the present invention also embodies an improvement in so far as it concerns the device for mechanically applying the glue to the wire. According to the present invention the wire is drawn across the face of a disk receiving the glue from a tank, so that when the said disk revolves different points of the circumferential face of said disk, carrying the glue, can approach different points of the advancing wire.

A machine of this kind is exemplified in the accompanying drawings, in which Figure 1 is a side elevation, Fig. 2 a plan, and Fig. 3 a front elevation. The parts which are of particular importance for the comprehension of the present invention are shown in part sections in Figs. 4 to 6. Figs. 4 and 6 correspond to the front elevation Fig. 3, while Fig. 5 corresponds to the plan in Fig. 2. Figs. 7, 8, 9 are longitudinal, transverse section and plan respectively of the gluing device. Fig. 10 is a vertical section through the arrangement carrying the pile of leaves.

In the bracket 1 of the body of the machine is fitted a stationary pivot 2, on which the star-shaped feed body is rotatably and vertically adjustably fitted. This feeding body consists of a disk 3 and a ratchet wheel 4 rigidly attached to the underside of said disk 3, and rests on a spring 5. Between the spring 5 and the disk 3 with the ratchet wheel 4 is fitted the eye of a lever 6, which engages with a pawl 7 in the wheel 4. In a slot in the said lever 6 engages the pin 8 of a rod 9 which is transversely displaceable in the body of the machine, at the other end of which a slotted lever 10 engages. On its spindle 11 is fitted at the rear the lever 12, which is coupled by the rod 13 to the crank 14 on the driving shaft 15. By means of this gearing the feeder will be advanced by a certain angle at each revolution of the driving shaft 15. The feeder is locked during the intervals by the spring pawl 16 engaging in the notches of disk 3.

On the disk rails 17 are radially arranged. Beyond their ends project the jaws of shears, which serve both to grip the stem wire and to sever the same. The one leg 18 of these shears is rigidly attached to the rail 17. The second leg of the shears 19 is pivoted on a pin 20 similar to an ordinary scissors. A spring 21 tends to hold the jaws of the shears open, by raising the rear end of leg 19. This leg abuts against the head of the set screw 21, which limits the upward stroke.

As the width to which the jaws of the shears open is controlled by this abutment, and as on this width depends how far the wire can enter into the jaws, these set screws afford the means of varying the radial distance between the wire-supporting points and the central axis of the feed and therewith the length of the wire between two jaws.

Another means for obtaining this purpose consists in the radial adjustment of the rails 17, for which purpose a number of screw holes 22 are provided in these rails for optional use. Instead of these rows of holes longitudinal slots may be employed. For varying the length of the stem the number of shear carriers may be varied, but then also the amount of feed and the angle of feed must be varied.

The wire comes at 24 from a reel not shown and runs over the gluing attachment hereafter described to the jaws of the shears. Under the pull produced by the turning of the feeder the wire 23 will pass at 25 into the jaws of a shears and will thereupon span in a tangential direction from jaw to jaw, thereby forming a polygon. Each side of this polygon will give one stem of a leaf.

The first operation, now, is to apply the glue to the wire. This is done while the wire is proceeding to the feeder and before it is gripped in the jaws, during the intermittent advance of the feeder. On a bracket 26 of the body of the machine is arranged the glue tank 27 which is fitted with its prismatic foot 28 into a dove-tail groove of the carrier and may be secured by means of the screw 29. In this tank, which has an inclined bottom a thin disk 31 revolves with its spindle 30, this disk being transverse to the advancing wire 23. The wire is guided over the periphery of the disk 31, passing between this periphery and the finger 32, for which finger a guide-roller or similar equivalent means may be substituted.

Both the wire and the disk move, the disk being transversely revolved by gearings later described. As the periphery of the disk moves transversely with respect to the wire, the glue is applied to the wire by parts of the periphery of the disk from which the glue has not been previously removed. In this manner, the wire which has not yet received any glue will come into contact with a portion of the periphery of the disk from which the glue has not yet been removed.

The gluing disk 31 is driven by means of the gears 33, 34, the shaft 35, the gear 36 and a toothed flange 37, which is fitted to the underside of disk 3 outside of the ratchet wheel 4. For reason of the hereinafter described sinking of the feeder during its inoperative intervals, the outer bearing 38 of shaft 35 swivels on the disk shaft 30, which it encircles with an eye 39, while the inner bearing 40 is slidable in a guide 40' and is raised from below by means of a spring acting against this bearing.

During the intermittent advance of the feeder the piece of wire held between each two shears passes over the pile of leaves. This pile is in a pocket 42 carried by the bracket 41 of the machine body, in which pocket the leaves 43 are piled one over the other. In this pocket the leaves are raised by means of a plunger 45 forced upward by means of weights 44. Tongues 46, projecting slightly into the pocket and over the edge of the uppermost leaf prevent the leaves from being forced out of the pocket. When the feeder sinks, what is effected by means hereinafter described, the glued wire will be pressed against the uppermost leaf. When the feeder rises again the leaf will adhere to the wire and pass the tongues 46, whereupon it will advance with the wire when the feeder advances.

By such means the wire sections having each a leaf glued to them enter into the embossing attachment supported on the main body of the machine, where the leaf is given by engraved dies a natural appearance. 47 is the bottom die, 48 the upper die which slides with its shank 49 in guide 50 and is raised and lowered by means of connecting rod 51 and crank 52. When the feeder advances the wires and leaves must be able to pass freely between the top and bottom dies, while during the embossing operation the leaf must be pressed down on to and into the bottom die. For this reason the feeder is so arranged, that it can be lowered on its shaft 2, as has been repeatedly hereinbefore mentioned. This lowering of the feeder is effected when the top die 48 moves down, by means of the presser 53, which is coupled by arm 54 with the shank 49 of the top die. The presser which thus moves downward together with the top die, strikes against one of the rails 17 and will thereby press down the feeder compressing the spring 5. Fig. 6 shows the feeder pressed down. The two levels—the upper level in which the feeder revolves, and the lower level, into which it is depressed when stationary—are indicated by dot-and-dash lines I—I and II—II.

The downward stroke of the die shank 49 is furthermore utilized for severing the wire and separating the finished leaves. For this purpose a second presser 55 is connected to the presser 53, which strikes, as evident from Figs. 4, 5 and 6, on the one leg of the shear 19 and thereby closes the jaws of the shear.

The downward stroke of the top die occurs during that half revolution of the driving shaft 15, during which the ratchet gear for advancing the feeder returns idle.

When the die rises again with the pressers 53 and 55, and the feeder follows under action of the spring 5, the ratchet gear again becomes operative and the feeder again advances.

I claim:

1. In a machine for making artificial leaves, a revolving feeder having a periphery of non-uniform curvature for feeding wire through said machine, and means for maintaining the said wire upon the periphery of said feeder during the revolution thereof.

2. In a machine for making artificial leaves, a feeder for feeding wire through said machine, said feeder having means for moving said wire through said machine in a non-rectilinear path, and means for severing said wire at the place of change of direction of movement thereof.

3. In a machine for making artificial leaves, a feeder for the wire consisting of a revolving, regular polygon, and means for gripping the wire to the perimeter of said polygon, the side of said polygon being equal to the length of the wire required for a single leaf.

4. In a machine for making artificial leaves, a feeder comprising a number of arms projecting radially from a common pivoted center, means on said arms for gripping and holding the wire fed through said machine, as said feeder revolves, said means being adjustable along the length of said radial arms, whereby the length of the wire held between said means on adjacent radial arms can be varied.

5. In a machine for making artificial leaves, a revolving feeder, comprising a plurality of radial arms, projecting from a common pivoted center, shears attached to said radial arms, means for feeding the wire to be passed through said machine to these shears, to be held and moved by said shears as the feeder revolves, and means for actuating said shears to sever the wire, at a predetermined point in the path of said wire.

6. In a machine for making artificial leaves, a revolving feeder, comprising a plurality of radial arms radiated from a common pivoted center, shears on said radial arms adapted to hold and move the wire as the feeder is revolved, and means for adjusting said shears radially on said arms.

7. In a machine for making artificial leaves, a revolving feeder, comprising a plurality of radial arms radiated from a common pivoted center, shears on said radial arms adapted to hold and move the wire as the feeder is revolved, and means for regulating the angle of opening of the jaws of said shears.

8. In a machine for making artificial leaves, means for holding a pile of leaves to be embossed, means for feeding wire through said machine, said wire being fed through a path adjacent at a given part thereof to said pile of leaves, and means for intermittently moving the said wire at the said adjacent point of its path, transverse to the said path, and upon the outermost leaf of the said pile of leaves.

9. In a machine for making artificial leaves, means for holding a pile of leaves, means for forcing said pile of leaves upward, stops for preventing said pile of leaves from being forced beyond a predetermined point, a feeder for moving wire through said machine, said wire passing at one point of its path near to and above said pile of leaves, and means for intermittently lowering said feeder and said wire upon the uppermost of said pile of leaves, and means for gluing the wire lowered upon said pile of leaves, before the lowering thereof, said feeder being returned to its initial position after the lowering thereof, whereby the said glued wire carries with it the uppermost of said pile of leaves.

10. In a machine for making artificial leaves, a glue receptacle, a revolving disk partially immersed in the said glue, and means for feeding the wire passing through said machine over the periphery of said disk, and in a direction at an angle to the plane of said disk.

In testimony wherof I affix my signature in the presence of two witnesses.

GEORG GUSTAV FOCKE.

Witnesses:
GUSTAV MÜLLER,
OTTO WOLFF.